(12) United States Patent
Casagram

(10) Patent No.: US 6,477,803 B1
(45) Date of Patent: Nov. 12, 2002

(54) SPLIT SHOT OPENER

(76) Inventor: Thomas M. Casagram, 206 Wallace St., Northglenn, CO (US) 80234

( * ) Notice: Subject to any disclaimer, the term of this patent is extended or adjusted under 35 U.S.C. 154(b) by 0 days.

(21) Appl. No.: 09/841,560

(22) Filed: Apr. 24, 2001

(51) Int. Cl.[7] .............................................. A02K 95/02
(52) U.S. Cl. ...................................................... 43/43.12
(58) Field of Search ........................ 43/43.12, 4, 44.92, 43/44.9, 42.53; D22/149

(56) References Cited

U.S. PATENT DOCUMENTS

| | | | | |
|---|---|---|---|---|
| 3,825,961 A | * | 7/1974 | Klein | 132/75.5 |
| 3,914,976 A | * | 10/1975 | Karr | 29/817 |
| 4,054,969 A | * | 10/1977 | Vogt | 452/132 |
| 4,753,030 A | * | 6/1988 | Ziglinski | 43/42.53 |
| 4,899,482 A | * | 2/1990 | Gerdes | 43/4 |
| 5,027,545 A | * | 7/1991 | Lowrie et al. | 43/44.92 |
| 5,031,351 A | * | 7/1991 | Rogel | 43/44.9 |
| 5,157,860 A | * | 10/1992 | Clark | 43/44.9 |
| 5,375,365 A | * | 12/1994 | Bronder | 43/43.12 |
| 5,557,874 A | * | 9/1996 | Pietrandrea et al. | 43/4 |
| 5,784,825 A | * | 7/1998 | Ross | 43/43.12 |
| 5,956,992 A | * | 9/1999 | Patton | 72/392 |

* cited by examiner

*Primary Examiner*—Charles T. Jordan
*Assistant Examiner*—Bret Hayes
(74) *Attorney, Agent, or Firm*—Dorsey & Whitney LLP

(57) ABSTRACT

A tool for opening the split of a round type split shot fishing weight in order to remove or insert an embedded fishing line. Typically, a split shot weight having a split is positioned in a groove with the split up and parallel to a pair of sharpened edges. Opening arms are then pinched by hand towards an attached bottom support. This drives the sharpened edges into opposing sides of the split. This position is generally held while a user bends the bottom of the support inward. In turn, this bending force pulls the sharpened edges outward and away from each other. Because the sharpened edges engage opposite sides of the split, the split shot weight is opened and a fishing line may be removed or inserted.

13 Claims, 1 Drawing Sheet

SPLIT SHOT OPENER

BACKGROUND OF THE INVENTION a. Field of the Invention

This invention relates to a manual tool, specifically to open the split of a round type "split shot fishing weight" to remove it from a fishing line.

b. Background Art

While fly fishing with a nymph, one must change the amount of weight on a fishing line to accommodate changing water conditions, such as current speed and depth. This is often accomplished by adding a "split shot weight" to the line. Other types of fishing also employ split shots.

It is commonly known that a split shot weight is a round or ball shaped weight with a V-shaped split halfway through its middle. The weight is commonly made out of lead. Fishing line is placed in the V-shaped split of the weight. The V-shaped split is then crimped around the line to secure the two together.

To remove a split shot weight from a fishing line, it is a common practice to pry the split open by hand, with one's finger nails. This can be difficult at times, if not impossible. Accordingly, there is a need in the art for an improved split shot weight opener.

BRIEF SUMMARY OF THE INVENTION

Generally, the split shot opening tool comprises a right and left opening arm. The arms are an extension of a shallow V-shaped bottom support strip made of a flexible material. This flexible material imparts movement and a means for returning to an original position after operation to the split shot opening tool. Accordingly, the tool can be repeatedly bent without fracturing. The bottom support strip includes a centering location groove for positioning a split shot weight in relation to the opening arms. Alternately, the present invention may use slots, holes, or other means for positioning the split shot weight.

Sharp edges are provided at the end of both the left and right opening arms to aid in gripping the split shot weight. Since all bends in the present invention are radiused, a split shot weight may be more easily pried open and the resiliency and longevity of the opener are enhanced.

That the present invention fulfills the above-identified needs will be apparent upon reviewing the below detailed description when taken in conjunction with the accompanying drawings.

DESCRIPTION OF THE PREFERRED EMBODIMENTS

Figure 1:
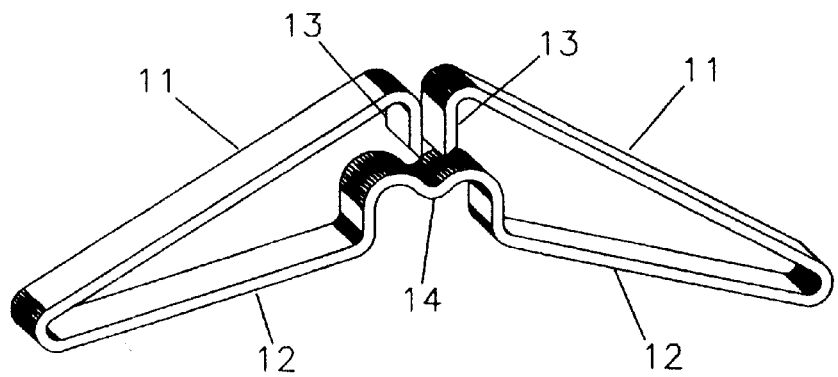
FIG. 1 is a perspective view of a split shot opening tool.

Specific reference is now made to the drawings. In the several views in the accompanying drawing and in the following specification, reference numerals indicate corresponding elements throughout.

In FIG. 1, an embodiment of the invention showing left and right opening arms 11 may be seen. At the end of the opening arms 11 is a sharpened edge 13. Opening arms 11 and sharpened edge 13 are attached to and extend from a bottom support 12.

The bottom support 12 includes a groove 14. The groove 14 permits a split shot weight 15 to be centered between the opening arms 11 and associated sharpened edges 13.

Operation of the Embodiment

Figure 2:
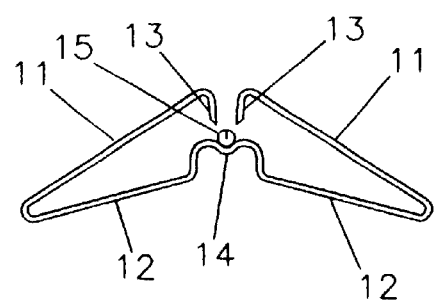
FIG. 2 is a side view of a split shot opening tool showing a split shot weight in an initial unopened position.
Figure 3:
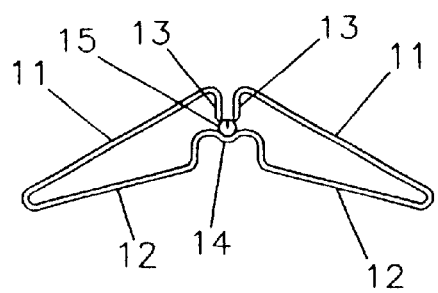
FIG. 3 is a side view of a split shot opening tool showing the arms in a gripping location holding a split shot weight.

Typically, a split shot weight 15 is positioned in the groove 14 with the split up and parallel to the sharpened edges 13, as shown in FIG. 2. The opening arms 11 are then pinched towards the bottom support 12 by hand. This drives the sharpened edges 13 into opposing sides of the split, as shown in FIG. 3.

Figure 4:
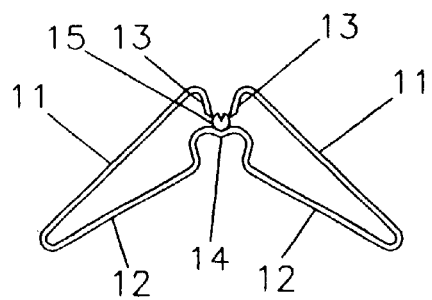
FIG. 4 is a side view of a split shot opening tool showing the final working position of the arms and an opened split shot weight.

This position is generally held while a user bends the bottom support 12, as shown in FIG. 4. In turn, this bending force pulls the sharpened edges 13 outward and away from each other. Because the sharpened edges engage opposite sides of the split, the split shot weight 15 is opened and a fishing line may be removed or inserted.

CONCLUSION

Accordingly, the present invention provides a highly reliable, lightweight, economical device that can be used by people of almost any age.

Although a detailed embodiment of the invention is illustrated in the drawings and described above, it should be understood by those of ordinary skill in the art that the present invention contemplates any configuration, design, or relationship of components that will function in a similar manner to that already described and provide an equivalent result. Further, the foregoing description of an embodiment of the invention may be changed in multiple ways without departing from the spirit or scope of the invention. Accordingly, the proper scope of the invention is defined by the claims set forth below.

Having described the invention what is claimed as new is:

1. A split shot opener, comprising:

a left and right opening arm;

a bottom support connecting the left and right opening arms;

a first sharpened edge extending at an angle from the end of the left opening arm;

a second sharpened edge extending at an angle from the end of the right opening arm; and a centering location positioned in the bottom support.

2. The split shot opener of claim 1, wherein the centering location is of sufficient size to hold a split shot weight.

3. The split shot opener of claim 2, wherein the left and right opening arms and bottom support are all made of a flexible material.

4. The split shot opener of claim 3, wherein the flexible material permits repeated bending of the bottom support without fracturing.

5. The split shot opener of claim 4, wherein the split shot opener is sized to be held between the thumbs and forefingers of a user, with the user's thumbs resting on the bottom support and one each of the user's forefingers resting on the left and right opening arms.

6. The split shot opener of claim 1, wherein the bottom support is connected to the left and right opening arms by a left and right radiused bend.

7. The split shot opener of claim 6, further comprising:

a first radiused arm bend connecting the first sharpened edge to the left opening arm; and a second radiused arm bend connecting the second sharpened edge to the right opening arm.

8. The split shot opener of claim 7, wherein the left and right opening arm, the bottom support, the left and right radiused bends, and the first and second radiused arm bends are made of a flexible material.

9. The split shot opener of claim 8, wherein the flexible material returns to an original position when not under pressure.

10. The split shot opener of claim 1, wherein the centering location comprises one of the members selected from the group consisting of a slot, a hole, and a groove.

11. A method for opening a split shot weight with a split shot opener, comprising:

placing the split shot weight into a groove centered on a bottom support of the split shot opener;

forcing a first and second sharpened edge into a split in the split shot weight; and prying open the split by forcing the first and second sharpened edge outward.

12. The method of claim 11, wherein the step of prying open the split by forcing the first and second sharpened edge outward comprises bending the bottom support inward.

13. The method of claim 12, wherein the step of forcing a first and second sharpened edge into a split in the split shot weight comprises pinching a left and right opening arm attached respectively to the first and second sharpened edges towards the bottom support.

* * * * *